(12) United States Patent
BenHarush et al.

(10) Patent No.: US 12,174,890 B2
(45) Date of Patent: Dec. 24, 2024

(54) AUTOMATED QUERY MODIFICATION USING GRAPHICAL QUERY REPRESENTATIONS

(71) Applicant: Dell Products L.P., Round Rock, TX (US)

(72) Inventors: Oshry BenHarush, Cedar Park, TX (US); Amihai Savir, Newton, MA (US); Ofir Ezrielev, Be'er Sheba (IL); Michael Thomas Kruzewski, Worcester, MA (US)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 17/854,844

(22) Filed: Jun. 30, 2022

(65) Prior Publication Data
US 2024/0004932 A1    Jan. 4, 2024

(51) Int. Cl.
*G06F 16/9032* (2019.01)
*G06F 16/901* (2019.01)

(52) U.S. Cl.
CPC .... *G06F 16/90328* (2019.01); *G06F 16/9024* (2019.01)

(58) Field of Classification Search
CPC .............. G06F 16/90328; G06F 16/9024
See application file for complete search history.

(56) References Cited

U.S. PATENT DOCUMENTS

| | | | | |
|---|---|---|---|---|
| 9,037,598 | B1* | 5/2015 | Morton | G06F 16/2477 707/706 |
| 2014/0358879 | A1* | 12/2014 | Bao | G06F 16/9532 707/706 |
| 2015/0249669 | A1* | 9/2015 | Gamage | H04L 63/10 726/26 |
| 2020/0356599 | A1* | 11/2020 | Xia | G06F 16/287 |

(Continued)

OTHER PUBLICATIONS

"Graphical Query Designer User Interface"; dated Jan. 20, 2022, https://docs.microsoft.com/en-us/sql/reporting-services/report-data/graphical-query-designer-user-interface?view=sql-server-ver16; downloaded on Jun. 22, 2022.

(Continued)

*Primary Examiner* — Mark D Featherstone
*Assistant Examiner* — Kweku William Halm
(74) *Attorney, Agent, or Firm* — Ryan, Mason & Lewis, LLP

(57) ABSTRACT

Techniques are provided for automated query modification using graphical query representations. One method comprises obtaining a query referencing multiple fields in one or more information elements; generating a graph of the query by: establishing nodes for referenced fields; connecting the established nodes corresponding to referenced fields from a same information element using one or more edges; adding edges, for operations in the query that establish a connection between information elements based at least in part on a related field in the information elements, to connect the nodes corresponding to the related fields; and setting a status of nodes corresponding to fields that are selected in the (Continued)

query to a selected status; and initiating an automatic generation of a modification of a portion of the query based at least in part on the graph. The modification may comprise a correction, completion and/or enrichment of the query.

20 Claims, 12 Drawing Sheets

(56) References Cited

U.S. PATENT DOCUMENTS

| | | | |
|---|---|---|---|
| 2021/0056956 A1* | 2/2021 | Dimitriadis | G10L 15/1815 |
| 2021/0176279 A1* | 6/2021 | Raphael | H04L 63/104 |
| 2023/0282368 A1* | 9/2023 | Josephson | G06F 40/30 |
| | | | 707/771 |

OTHER PUBLICATIONS

"How to Represent an SQL Query Graphically" https://stackoverflow.com/questions/39231976/how-to-represent-an-sql-query-graphically; downloaded on Jun. 22, 2022.

Ma et al., "Deep Graph Similarity Learning: a Survey"; Data Mining and Knowledge Discovery (2021).

Xie et al., "Self-Supervised Learning of Graph Neural Networks: A Unified Review"; arXiv:2102.10757v5 [cs.LG] Apr. 25, 2022.

"Database Documentation Generators", https://dbmstools.com/categories/database-documentation-generator-tools; downloaded on Jun. 27, 2022.

* cited by examiner

FOR EACH FROM STATEMENT IN QUERY:

FOR EACH TABLE IN FROM STATEMENT:

FOR EACH COLUMN IN CURRENT TABLE:

CREATE A NODE IN GRAPH AND ADD AN EDGE WITH ALL OTHER NODES IN THE CURRENT TABLE;

FOR EACH JOIN OPERATION:

ADD AN EDGE INDICATING THE COLUMNS USED IN THE JOIN OPERATION;

FOR EACH SELECT STATEMENT IN QUERY:

UPDATE FEATURE VECTOR OF ANY NODE CORRESPONDING TO A SELECTED COLUMN TO INDICATE SELECTED STATUS;

FOR EACH NEW COLUMN THAT RESULTS FROM A QUERY FUNCTION APPLIED TO ONE OR MORE COLUMNS:

ADD A NEW NODE IN GRAPH FOR NEW COLUMN AND CONNECT NEW NODE WITH AN EDGE TO THE ONE OR MORE NODES ASSOCIATED WITH THE ONE OR MORE COLUMNS AND ADD QUERY FUNCTION IDENTIFIER AS AN EDGE LABEL;

FOR EACH WHERE STATEMENT:

FOR EACH FILTER TYPE APPLIED TO ONE OR MORE PARTICULAR COLUMNS, ADD A NEW NODE IN GRAPH AND CONNECT NEW NODE WITH EDGES TO NODES ASSOCIATED WITH THE ONE OR MORE PARTICULAR COLUMNS AND ADD LOGIC OPERATION AS A FEATURE ;

FOR EACH ADDITIONAL QUERY OPERATION, CREATE A NEW NODE IN GRAPH AND CREATE AN EDGE TO THE NODES ASSOCIATED WITH THE ONE OR MORE RELEVANT COLUMNS

FIG. 3

QUERY:
SELECT COL. 1, COL. 2, COL. 4, COL. 6, AVG (COL. 2)
FROM (TABLE 1 JOIN TABLE 2 ON TABLE 1.COL. 2 = TABLE 2.COL. 4)
WHERE COL. 1 > X OR COL. 1 < Y
GROUP BY COL. 1

FIG. 4A

| POSSIBLE QUERY ERROR | SUGGESTED QUERY CORRECTIONS |
|---|---|
| QUERY COMPRISES JOIN OPERATION FOR TWO OR MORE DATA SOURCES NOT PREVIOUSLY ENCOUNTERED FOR QUERY AUTHOR'S BUSINESS UNIT | PRESENT LIST OF JOINS THAT WERE PERFORMED IN THE QUERY'S CLUSTER BETWEEN THE TWO OR MORE DATA SOURCES |
| QUERY REFERENCES DATABASES THAT QUERY AUTHOR'S BUSINESS UNIT HAS NOT PREVIOUSLY INTERACTED WITH | GENERATE WARNING NOTIFICATION – NO CORRECTION |
| QUERY COMPRISES STRING FILTER OR OTHER CATEGORICAL FILTERS THAT HAVE NOT PREVIOUSLY BEEN ENCOUNTERED FOR QUERY AUTHOR'S BUSINESS UNIT | PRESENT LIST OF FILTERS THAT WERE PERFORMED IN THE QUERY'S CLUSTER FOR A VIEW COMPRISING THE SAME DATA SOURCES |
| QUERY COMPRISES NUMERICAL FILTERS THAT ARE AN ORDER OF MAGNITUDE OR MORE FROM OTHER SUCH FILTERS | PRESENT RANGE OF NUMBERS USED FOR SUCH A FILTER IN THE QUERY'S CLUSTER |
| QUERY COMPRISES "GROUP BY" STATEMENTS THAT HAVE NOT PREVIOUSLY BEEN ENCOUNTERED (IN QUERY CONTEXT) | PRESENT LIST OF "GROUP BY" STATEMENTS THAT WERE PERFORMED IN THE QUERY'S CLUSTER FOR A VIEW COMPRISING THE SAME DATA SOURCES |
| QUERY IS MISSING A FREQUENTLY USED QUERY FLAG | PRESENT LIST OF FREQUENTLY USED QUERY FLAGS IN THE QUERY'S CLUSTER THAT ARE NOT PRESENT IN THE QUERY |

FIG. 7

AUTOMATED QUERY MODIFICATION USING GRAPHICAL QUERY REPRESENTATIONS

FIELD

The field relates generally to information processing systems, and more particularly to query processing in such systems.

BACKGROUND

Data management techniques are often employed in an organization to allow data of the organization to be stored and accessed in an effective and efficient manner. Queries of the organization data are often utilized to identify, access and analyze the appropriate organization data for a given task. Effective data management techniques become increasingly important as an organization grows, especially for multi-domain data assets.

SUMMARY

In one embodiment, a method comprises obtaining a user query that references a plurality of data fields in one or more information elements, wherein at least a subset of the plurality of data fields may be selected, and wherein the user query further comprises one or more operations; generating a graphical representation, comprising a plurality of nodes connected by one or more edges, of the user query by performing the following steps: establishing nodes for respective ones of the referenced data fields; connecting the established nodes corresponding to the referenced data fields from a same information element using one or more edges; adding edges, for respective ones of the one or more operations in the user query that establish a connection between two or more information elements based at least in part on a related data field in the two or more information elements, to connect the nodes corresponding to the related data fields; and setting a status of one or more nodes corresponding to the data fields that are selected in the user query to a selected status; and initiating an automatic generation of at least one modification of at least a portion of the user query based at least in part on the graphical representation.

In some embodiments, the user query comprises a partial user query, and the method further comprises: applying the graphical representation of the partial user query to a generative graph model to obtain a suggested completion of the partial user query, wherein the suggested completion provides a corresponding missing portion of the partial user query, wherein the generative graph model is trained to reconstruct a missing portion of at least one user query using one or more masked versions of a plurality of query graphs each associated with a corresponding historical user query; and wherein the at least one modification comprises the suggested completion of the partial user query.

In one or more embodiments, the user query is applied to one or more prediction algorithms that identify one or more query errors in the user query; and wherein the at least one modification comprises a suggested correction of the identified one or more query errors. The one or more prediction algorithms may be configured to: (i) assign the user query to a cluster of a plurality of clusters and employ one or more query error handling rules associated with the assigned cluster that identify the one or more query errors in the user query and a corresponding suggested correction of the one or more query errors in the user query, and/or (ii) identify the one or more query errors in the user query, using one or more trained models, and provide a corresponding suggested correction of the identified one or more query errors in the user query.

In at least one embodiment, the user query is evaluated to identify at least one data characteristic used to perform at least one operation in the user query; and wherein the at least one modification comprises a suggested connection with one or more additional information elements based at least in part on the identified at least one data characteristic.

Other illustrative embodiments include, without limitation, apparatus, systems, methods and computer program products comprising processor-readable storage media.

BRIEF DESCRIPTION OF THE DRAWINGS

FIG. 3 illustrates exemplary pseudo code for generating a graphical representation of a query in accordance with an illustrative embodiment;

FIG. 4A illustrates a representative query in accordance with an illustrative embodiment;

FIG. 7 is a table illustrating an exemplary query error handling ruleset that may be used by the automated query correction engine of FIG. 6 in accordance with an illustrative embodiment;

DETAILED DESCRIPTION

Figure 1:
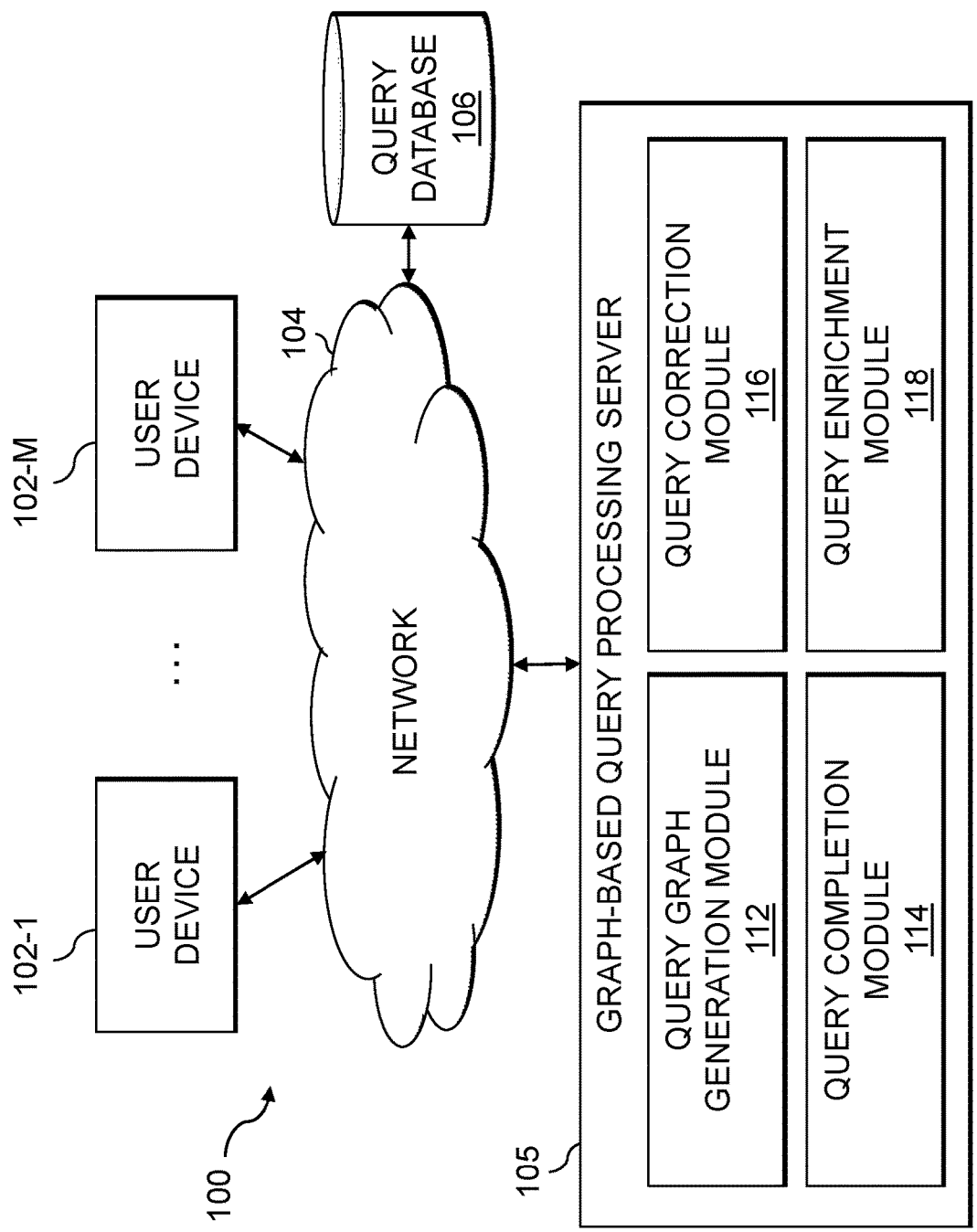
FIG. 1 illustrates an information processing system configured for automated query modification using graphical query representations in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for automated query modification using graphical query representations.

One or more aspects of the disclosure address one or more technical problems related to the management of organization data. It is often difficult to find, connect, and join multiple data sets spread among an organization. In addition, it may be difficult to properly compose queries without guidance from a domain expert, especially for multi-domain data sets.

Domain experts are largely responsible for the management of organization data and related business processes for a given domain. Domain experts, however, often have limited availability and may not always provide rigorous documentation of the data or of the business process. Thus, it is often difficult to interact with such domain experts in order to identify and better understand the organization data or business process. In addition, knowledge sharing across domains may pose even greater challenges.

One or more aspects of the disclosure recognize that improperly composed queries may lead to inaccurate and/or incomplete data that may skew the desired insights. The manner in which a business process reflects in the organization data, the particular data to use for a given query, and/or the flags used in the given query to filter the data may all contribute to obtaining the proper data, in response to the given query, for a given analysis. For example, the application of an improper filter may introduce archived, erroneously flagged and/or otherwise poor data into the resulting data used for analysis. Thus, insights obtained from such resulting data may be inaccurate and/or incomplete, or otherwise result in poor performance.

In one or more embodiments, graph-based query processing techniques are provided that generate graphical query representations comprised of nodes, edges and labels based on the content of a given query. Graphical query representations of historical executed queries and associated metadata are leveraged to automatically guide the creation, modification and enrichment of new queries by suggesting alternative queries based at least in part on the graphical representation of a user-provided query.

In some embodiments, the disclosed techniques for automated query modification using graphical query representations provide an organization (e.g., a company, department or other business unit) with automated completion of queries, automated correction of queries and/or automated enrichment of queries, as discussed further below. In at least some embodiments, the training data that is used to train one or more business processes is limited to the historical queries from a given organization, or the historical queries from the given organization may be assigned a higher weight in the training data.

FIG. 1 shows an information processing system 100 configured in accordance with an illustrative embodiment. The information processing system 100 comprises a plurality of user devices 102-1 through 102-M, collectively referred to herein as user devices 102. The information processing system 100 further comprises one or more graph-based query processing servers 105 and a query database 106, discussed below.

The user devices 102 may comprise, for example, host devices and/or devices such as mobile telephones, laptop computers, tablet computers, desktop computers or other types of computing devices (e.g., virtual reality (VR) devices or augmented reality (AR) devices). Some of these processing devices are also generally referred to herein as "computers." The user devices 102 may comprise a network client that includes networking capabilities such as ethernet, Wi-Fi, etc.

One or more of the user devices 102 and the graph-based query processing server 105 may be coupled to a network 104, where the network 104 in this embodiment is assumed to represent a sub-network or other related portion of a larger computer network. The network 104 is assumed to comprise a portion of a global computer network such as the Internet, although other types of networks can be part of the computer network, including a wide area network (WAN), a local area network (LAN), a satellite network, a telephone or cable network, a cellular network, a wireless network such as a Wi-Fi or WiMAX network, or various portions or combinations of these and other types of networks. The network 104 in some embodiments therefore comprises combinations of multiple different types of networks, each comprising processing devices configured to communicate using internet protocol (IP) or other related communication protocols.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

One or more of the user devices 102 and the graph-based query processing server 105 illustratively comprise processing devices of one or more processing platforms. For example, the graph-based query processing server 105 can comprise one or more processing devices each having a processor and a memory, possibly implementing virtual machines and/or containers, although numerous other configurations are possible. The processor illustratively comprises a microprocessor, a microcontroller, a central processing unit (CPU), a graphics processing unit (GPU), a tensor processing unit (TPU), an application-specific integrated circuit (ASIC), a field-programmable gate array (FPGA) or other type of processing circuitry, as well as portions or combinations of such circuitry elements.

One or more of the user devices 102 and the graph-based query processing server 105 can additionally or alternatively be part of edge infrastructure and/or cloud infrastructure such as an Amazon Web Services (AWS) system. Other examples of cloud-based systems that can be used to provide at least portions of the user devices 102 and/or the graph-based query processing server 105 include Google Cloud Platform (GCP) and Microsoft Azure.

As shown in FIG. 1, the exemplary graph-based query processing server 105 comprises a query graph generation module 112, a query completion module 114, a query correction module 116 and a query enrichment module 118, as discussed further below. In one or more embodiments, the query graph generation module 112 may be used, for example, to generate a graphical representation of one or more queries. The query completion module 114 may leverage graphical representations of historical queries to automatically generate a suggested completion of at least one partial user query, as discussed further below in conjunction with FIG. 5.

In the example of FIG. 1, the exemplary query correction module 116 may leverage graphical representations of historical queries to automatically generate a suggested correction of one or more errors identified in at least one user query, as discussed further below in conjunction with FIGS. 6 and 7. The query enrichment module 118 may leverage graphical representations of historical queries to automatically generate a suggested completion of at least one partial user query, as discussed further below in conjunction with FIG. 8.

It is to be appreciated that this particular arrangement of modules 112, 114, 116, 118 illustrated in the graph-based query processing server 105 of the FIG. 1 embodiment is presented by way of example only, and alternative arrangements can be used in other embodiments. For example, the functionality associated with modules 112, 114, 116, 118 in other embodiments can be combined into a single module, or separated across a larger number of modules. As another example, multiple distinct processors and/or memory elements can be used to implement different ones of modules 112, 114, 116, 118 or portions thereof. At least portions of modules 112, 114, 116, 118 may be implemented at least in part in the form of software that is stored in memory and executed by a processor.

The graph-based query processing server 105 may further include one or more additional modules and other components typically found in conventional implementations of such devices, although such additional modules and other components are omitted from the figure for clarity and simplicity of illustration.

In the FIG. 1 embodiment, the graph-based query processing server 105 is assumed to be implemented using at least one processing platform, with each such processing platform comprising one or more processing devices, and each such processing device comprising a processor coupled to a memory. Such processing devices can illustratively include particular arrangements of compute, storage and network resources.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different instances or portions of the graph-based query processing server 105 to reside in different data centers. Numerous other distributed implementations of the components of the system 100 are possible.

As noted above, the graph-based query processing server 105 can have an associated query database 106 configured to store information related to one or more queries, such as query metadata and/or graphical representations of user queries and/or modifications made to user queries using the disclosed automated query modification techniques. In some embodiments, the query metadata for historical queries of a given organization may comprise, for example, data objects; query submitter identifier; query submitter organization and job description; frequency of query runs; query flags; query filters and/or a flag indicating whether the query is performed multiple times or one time. Although the query information is stored in the example of FIG. 1 in a single query database 106, in other embodiments, an additional or alternative instance of the query database 106, or portions thereof, may be incorporated into the graph-based query processing server 105 or other portions of the system 100.

The query database 106 in the present embodiment is implemented using one or more storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the user devices 102 and the graph-based query processing server 105 can be one or more input/output devices (not shown), which illustratively comprise keyboards, displays or other types of input/output devices in any combination. Such input/output devices can be used, for example, to support one or more user interfaces to a user device 102, as well as to support communication between the graph-based query processing server 105 and/or other related systems and devices not explicitly shown.

The memory of one or more processing platforms illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1 for automated query modification using graphical query representations is presented by way of illustrative example only, and in other embodiments additional or alternative elements may be used. Thus, another embodiment includes additional or alternative systems, devices and other network entities, as well as different arrangements of modules and other components.

Figure 2:
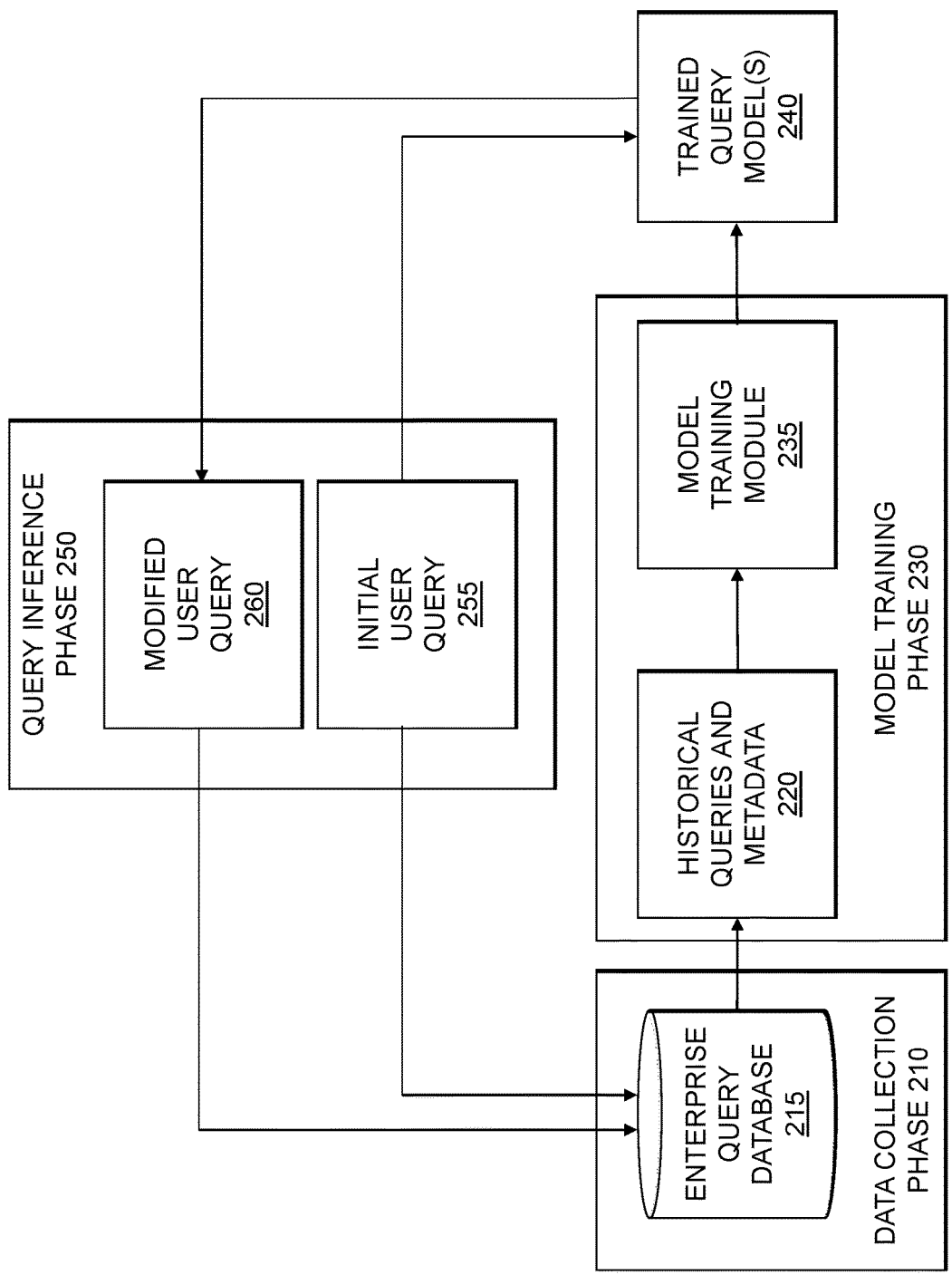
FIG. 2 illustrates an exemplary training of at least one graph-based query processing model and an application of a user query to a trained graph-based query processing model to generate an automated query modification in accordance with an illustrative embodiment.

FIG. 2 illustrates an exemplary training of at least one graph-based query processing model, using historical queries and associated metadata 220, and an application of an initial user query 255 to a trained query model 240 to generate a modified user query 260 comprising an automated query modification of the initial user query 255 in accordance with an illustrative embodiment. The example of FIG. 2 comprises an exemplary data collection phase 210, a model training phase 230 and a query inference phase 250.

During the data collection phase 210, historical queries and associated metadata are monitored and collected for storage in an enterprise query database 215. In addition, as a user submits an initial user query 255 (which may include an incomplete or a faulty query), during a query inference phase 250, the initial user query 255 (and associated metadata) may also be stored in the enterprise query database 215. The enterprise query database 215 may be an exemplary implementation of the query database 106 of FIG. 1. As noted above, in some embodiments, the metadata associated with queries may comprise, for example, data objects; query submitter identifier; query submitter organization and job description; frequency of query runs; query flags; query filters and/or a flag indicating whether the query is performed multiple times or one time.

During the model training phase 230, the historical queries and metadata 220 are extracted from the enterprise query database 215 and a model training module 235 employs supervised learning and/or clustering techniques, for example, to generate one or more trained query models 240, such as one or more machine learning models and/or natural language processing (NLP) models, as discussed further below. Generally, the one or more trained query models 240 analyze the graphical representations of the historical queries and associated metadata 220 to identify the data sources, connections between the data sources and to recommend, for example, frequently used data sources, join keys, and filtering flags. In addition, the model training module 235 may analyze the filters used in the historical queries, as well as the importance and validity of these historical queries by processing the metadata with, for example, the job description of the query submitter identifier, and whether the query is an automated query or a one-time query.

During the query inference phase 250, upon receipt of the initial user query 255, the initial user query 255 is applied to the one or more trained query models 240. The query completion module 114, the query correction module 116 and/or the query enrichment module 118 of FIG. 1 may be leveraged to automatically modify the initial user query 255 using the one or more trained query models 240 to produce a corresponding modified user query 260. The initial user query 255 and/or the modified user query 260 may be stored in the enterprise query database 215. For example, the query completion module 114 may suggest completion possibilities, for example, when the initial user query 255 is a partial query by using other similar queries that have a shared context (e.g., within a common organization) with the initial user query 255 to generate the modified user query 260. The query correction module 116 may identify possible errors (e.g., using query clustering and corresponding rules, as discussed further below in conjunction with FIGS. 6 and 7) in the initial user query 255, for example, by identifying join keys and/or data objects in the initial user query 255 that were not previously encountered in the organization, or by identifying filters that are commonly used in the organization that are missing in the initial user query 255, for use in the modified user query 260. The query enrichment module 118 may recommend including additional data tables in the initial user query 255, for example, by including a proper joining query structure in the modified user query 260, when the one or more trained query models 240 recognize that previously submitted queries against a requested data object are commonly joined with one or more additional data objects.

Figure 4B:
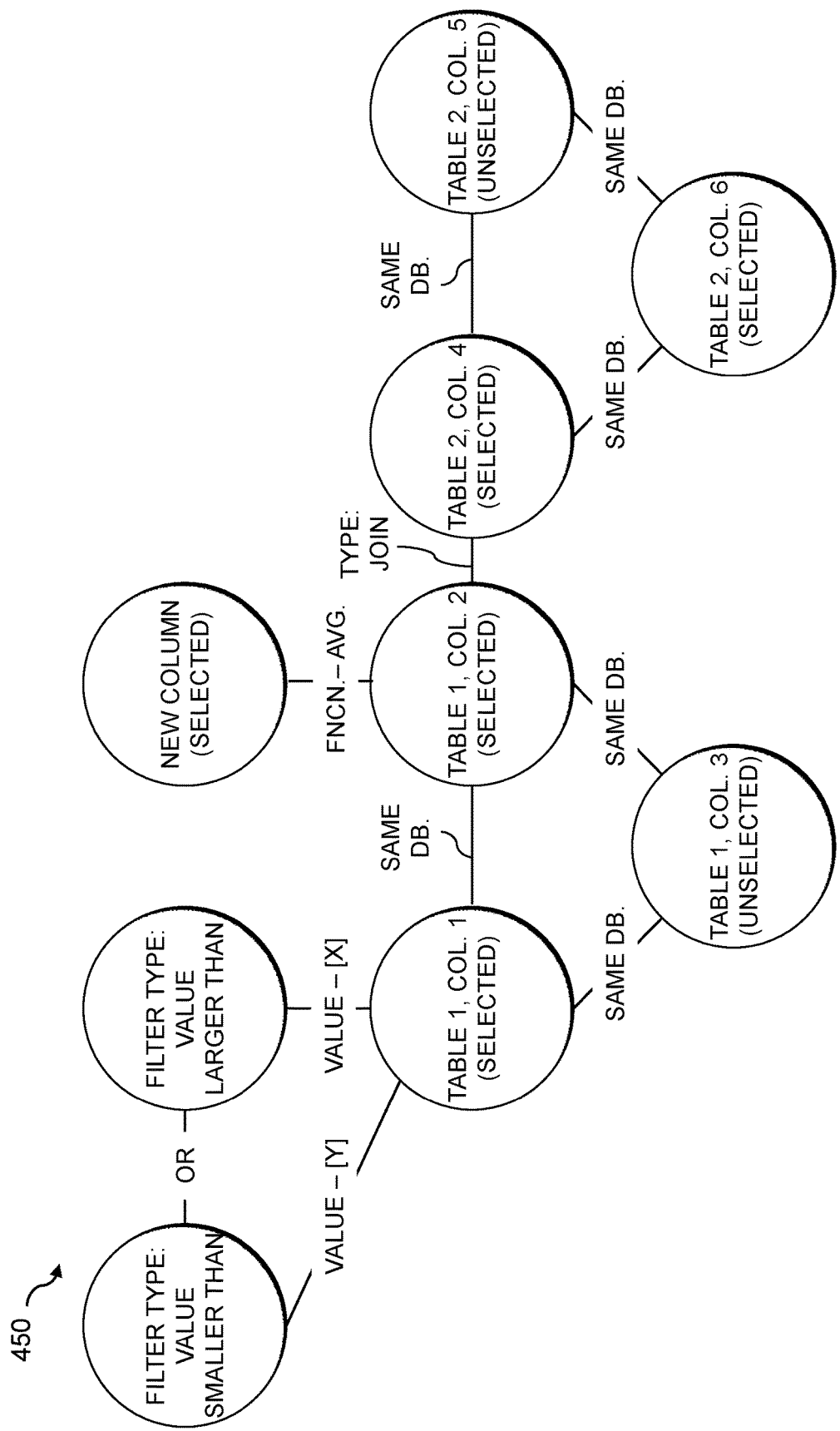
FIG. 4B illustrates an exemplary graphical representation of the representative query of FIG. 4A in accordance with an illustrative embodiment.

FIG. 3 illustrates exemplary pseudo code 300 for generating a graphical representation of a query in accordance with an illustrative embodiment. The example of FIG. 3 and the related examples of FIGS. 4A and 4B, are directed to processing representative queries in the Structured Query Language (SQL). The disclosed techniques for generating graphical query representations of a given query and for modifying queries using such graphical query representations may also be applied in non-SQL environments as well, as would be apparent to a person of ordinary skill in the art and as discussed further below.

The exemplary pseudo code 300 comprises a number of steps to construct a graph representing a given query expressed in the SQL language. The exemplary pseudo code 300 processes different types of query statements and operations, for example, to generate the graph representing the given query. The pseudo code 300 in the example of FIG. 3 comprises a first loop for processing "from" statements in a query that reference one or more columns in one or more database tables. A first sub-loop is initiated for each database table referenced in a "from" statement and a second sub-loop is initiated for each column of the current database table. For a given column being processed, a node is added in the graph and one or more edges are added to all other nodes in the current table.

The pseudo code 300 comprises a second loop for processing "join" operations in a query that connect two or more database tables using two or more columns identified in the "join" operation. The second loop adds an edge to the graph to indicate the columns used in the "join" operation. A third loop in the pseudo code 300 processes "select" statements in a query to select columns from a database table. The third loop updates the feature vector of any node corresponding to a selected column to indicate the selected status.

In the example of FIG. 3, the pseudo code 300 comprises a fourth loop for processing new columns that result from a query function in a query that is applied to one or more columns (for example, determining an average of a column). The fourth loop adds a new node in the graph for a given new column and connects the new node with an edge to the one or more nodes associated with the one or more columns that the query function was applied to and adds a query function identifier as an edge label to the added edge.

The pseudo code 300 further comprises a fifth loop for processing "where" statements in a query. The fifth loop comprises a sub-loop for each filter type applied to one or more particular columns. The sub-loop of the fifth loop adds a new node in the graph and connects the new node with edges to nodes associated with the one or more particular columns and adds the logic operation as a feature of the new nodes.

A sixth loop in the pseudo code 300 processes additional query operations and creates an edge to the nodes associated with the one or more relevant columns of the additional query operations.

It is noted that a "group by" clause in a query is used to obtain summary data based on one or more groups. The groups can be formed on one or more columns. For example, a group by query may be used to count a number of employees in a given company or department, or to obtain the total salaries for a given department.

As noted above, the disclosed techniques for generating graphical query representations of a given query and for modifying queries using such graphical query representations may also be applied in non-SQL environments. For example, FROM statements in a SQL query, for example, may be more generally referred to herein as statements in a given query that identify one or more information elements that a given query is to be applied against. The information elements may comprise, for example, one or more data structures (such as database tables in a SQL environment) and/or one or more data objects (such as JSON (JavaScript Object Notation) files, blobs or data objects in a non-SQL environment). Thus, the database tables referenced in FIG. 3 may alternatively be referred to as JSON blobs or data objects in other embodiments. In addition, the data columns referenced in FIG. 3 may alternatively be referred to as data fields in other embodiments (e.g., when dealing with a JSON object, each data field may be a key having a corresponding value).

In addition, "join" operations in a SQL query, for example, may be more generally referred to herein as operations that that establish a connection between two or more information elements based on a related data field in the two or more information elements. "Select" statements in a SQL query, for example, may be more generally referred to herein as statements in a given query that select one or more data fields.

Further, "where" statements in a SQL query, for example, may be more generally referred to herein as statements (or operations) that specify one or more conditions (e.g., filters) for obtaining data from one or more information elements.

FIG. 4A illustrates a representative query 400 in accordance with an illustrative embodiment. Generally, a data query may comprise base objects (such as tables or databases); data columns or metadata; data joins or merges; filters or flags; overlay functions (such as those used to create new data columns or groupings); and later data splits (such as creation of training data, evaluation data and test data). Query-level information, such as a frequency of query runs, may be used in some embodiments for differentiated weighting of data samples or graph-level features. A given query can be tokenized to its constituent parts, which will become nodes and edges in the graphical representation of the given query.

In the example of FIG. 4A, the representative query 400 comprises a "select" statement that selects columns 1, 2, 4, 6 and an average of column 2 from database tables 1 and 2 identified in a "from" statement. The database tables 1 and 2 are joined in the representative query 400 on identified columns (e.g., column 2 of table 1 and column 4 of table 2) specified in the "join" statement. The "where" statement in the example of FIG. 4A filters the data records in column 1 of table 1 to values greater than a value, X, or values smaller than a value, Y. The "group by" statement in the representative query 400 can be used to obtain summary data by forming a data group on column 1.

FIG. 4B illustrates an exemplary graphical representation 450 of the representative query 400 of FIG. 4A, using the pseudo code 300 of FIG. 3, in accordance with an illustrative embodiment. In the example of FIG. 4B, an exemplary heterogeneous graph representation is provided for the representative query 400 (e.g., against a SQL database or a NoSQL database using, for example, metadata tagging). The exemplary graphical representation 450 comprises a plurality of nodes connected by edges in accordance with the pseudo code 300 of FIG. 3. In some embodiments, the graphical representation 450 of a given query may be implemented as a heterogeneous query graph comprising nodes and/or edges of different types. For example, in some embodiments, the nodes and/or edges of a given query graph may be encoded using different colors to represent a corresponding different respective type. In another implementation, a given edge may be represented by a vector comprising different features and/or dimensionality.

Figure 5:
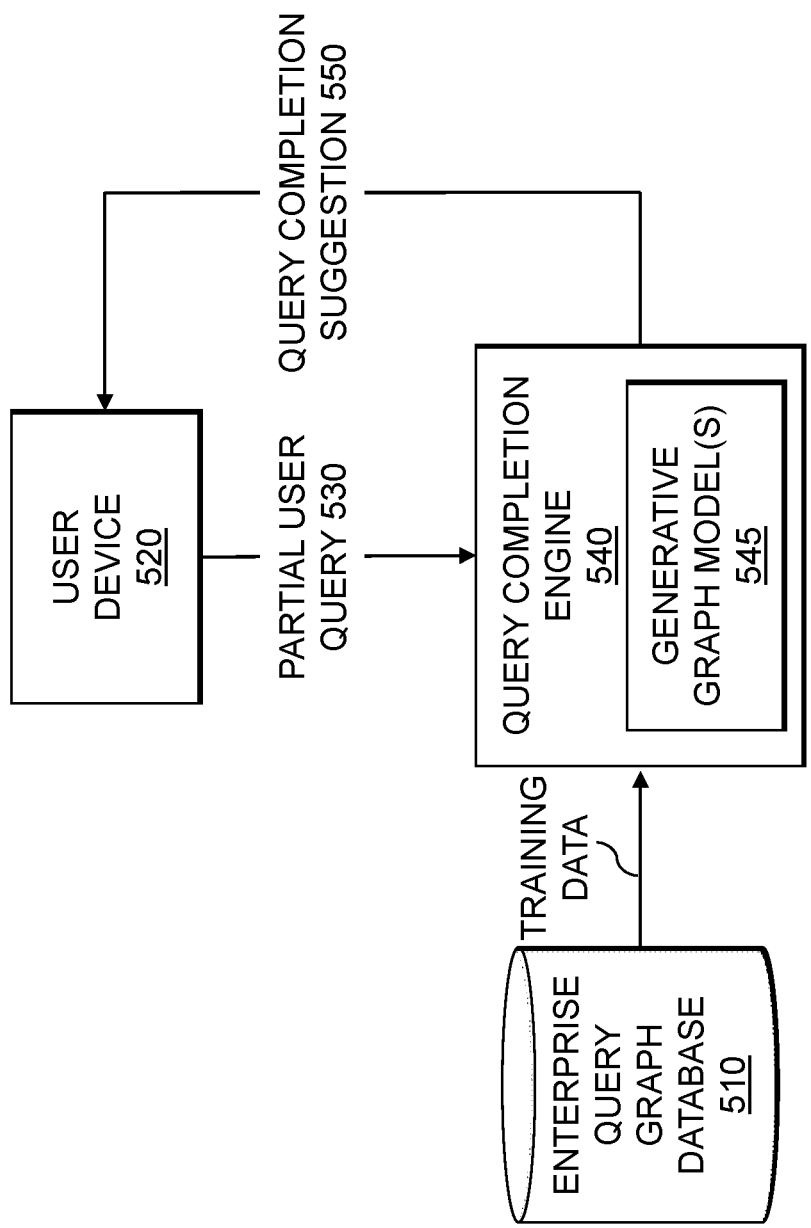
FIG. 5 illustrates an automated query completion engine in accordance with an illustrative embodiment.

FIG. 5 illustrates a query completion engine 540 in accordance with an illustrative embodiment. In the example of FIG. 5, training data, comprising graphical representations of historical queries of a given organization, is obtained from an enterprise query graph database 510 and is used to train one or more generative graph models 545 of a query completion engine 540. During the training process, one or more masked versions of a plurality of graphical representations of historical queries are obtained by masking (e.g., by erasing, deleting, removing, covering or disabling) at least one portion of an original historical query and the one or more generative graph models 545 are trained to reconstruct the masked portion of a given original historical query.

In at least some embodiments, the one or more generative graph models 545 may comprise, for example, a reconstructive self-supervised (SSL) model of graph neural networks (GNNs) or Generative Flow Networks. For a more detailed discussion of the training and use of representative generative graph models 545, see, for example, Yaochen Xie et al., "Self-Supervised Learning of Graph Neural Networks: A Unified Review," arXiv:2102.10757 (February 2021), incorporated by reference herein in its entirety.

During an inference phase, a user device 520 provides a partial user query 530, having at least one missing or incomplete portion, that is applied to the query completion engine 540. The query completion engine 540 processes a graphical representation of the partial user query 530 using the one or more generative graph models 545 to generate at least one query completion suggestion 550, that provides at least one suggestion for completing the partial user query 530. In some embodiments, the query completion suggestion 550 may be presented to the user device 520 in the context of a complete query comprising the partial user query 530 and the query completion suggestion 550, for execution by the user.

Figure 6:
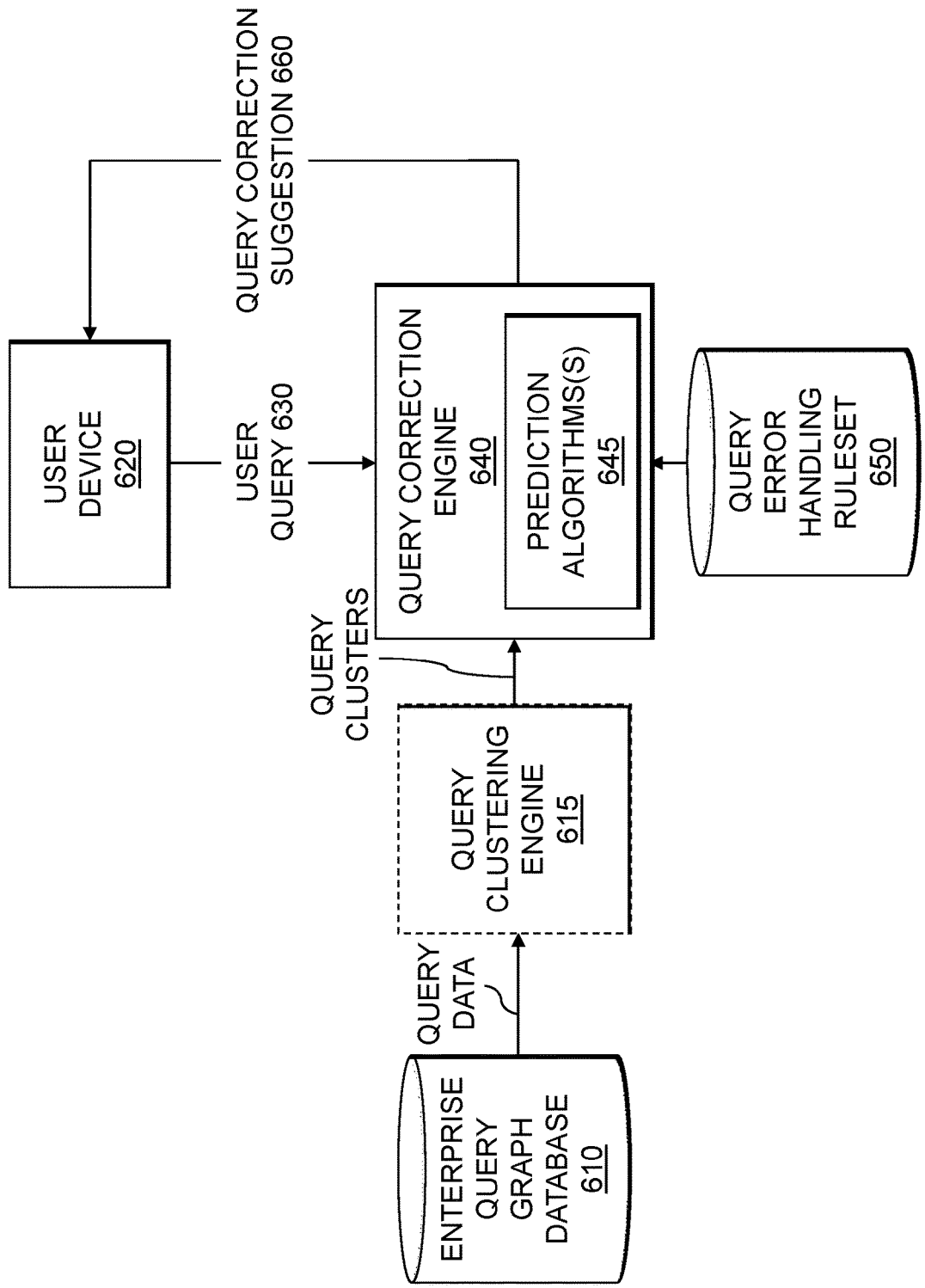
FIG. 6 illustrates an automated query correction engine in accordance with an illustrative embodiment.

FIG. 6 illustrates a query correction engine 640 in accordance with an illustrative embodiment. In the example of FIG. 6, query data, comprising graphical representations of historical queries of a given organization, is obtained from an enterprise query graph database 610. In some embodiments, the graph-based query data is applied to a query clustering engine 615 that clusters the graph-based query data into clusters of similar queries. The query clustering engine 615 may optionally be omitted in other embodiments, as indicated by the dashed outline of the query clustering engine 615 in FIG. 6.

One possible example of a similarity-based graph clustering algorithm that may be employed by the query clustering engine 615 is described, for example, in Ma et al., "Deep Graph Similarity Learning: A Survey," Data Mining and Knowledge Discovery, 35, 688-725 (2021), incorporated by reference herein in its entirety. Each query cluster is associated in some embodiments with a different query error. In addition, each query cluster may comprise one or more corresponding corrections for the associated query error that may be provided by a domain expert or may be learned in a training phase by processing the graphical representations of the historical queries.

During an inference phase, a user device 620 provides a user query 630, having at least one query error, that is applied to the query correction engine 640. The query correction engine 640 processes a graphical representation of the user query 630 using one or more prediction algorithms 645 to generate at least one query correction suggestion 660. In at least some embodiments, the one or more prediction algorithms 645 identify one or more possible errors in the user query 630 and determine corresponding corrections of the identified one or more possible errors. A query error handling ruleset 650, as discussed further below in conjunction with FIG. 7, may be employed in some embodiments to identify possible query errors and corresponding corrections of the identified possible query errors.

In a cluster-based implementation, for example, the user query 630 will be assigned to a query cluster having one or more associated query errors and one or more corresponding error corrections. In a model-based approach, supervised learning can be employed to train one or more models to map query errors to corresponding query corrections. In one supervised learning implementation, query graphs are processed, during a training phase, for historical queries with corresponding corrected query graphs, where the labels indicate a type of query error. The trained model maps one or more query errors to one or more corresponding query correction suggestions 660. During an inference phase, a query graph is processed by the trained model to predict a type of error in the applied query graph with a corresponding correction of the predicted error type.

In another representative supervised learning implementation, a first model, such as a first supervised GNN model, is trained to identify errors using training data comprising query graphs for historical queries with corresponding type-of-error labels (e.g., provided by a domain expert). During an inference phase, a query graph is processed by the first model to predict a type of error in the applied query graph. A second model, such as a second supervised GNN model, receives one or more query errors in a user query, during a supervised training phase, with a corresponding label indicating a type of correction (e.g., a row in the table of FIG. 7, discussed below, with a recommended replacement action as a correction to replace a portion of a query graph, for example, by switching data objects, or by providing a corrected query graph). The second model learns to identify a corresponding solution of the one or more query errors, during the supervised training phase, in the context of a representation of the user query. During an inference phase, a query graph comprising at least one error is processed by the second model as an input and the second model generates a corresponding recommended query error correction.

Global parameters may be used by the GNN model(s) and may comprise a representation of an error to be corrected, which may be linked in some embodiments to parts of the query graph. The query graph may be extended to comprise a global parameters node, or the global parameters can be applied as an input to the second model with the query graph.

FIG. 7 is a table illustrating an exemplary query error handling ruleset 700 that may be used by the automated query correction engine 640 of FIG. 6 in accordance with an illustrative embodiment. In the example of FIG. 7, the exemplary query error handling ruleset 700 comprises a plurality of possible query errors and corresponding suggested query corrections of the possible query errors. As noted above, the suggested query corrections for each type of query error may be obtained for each supported query error type, for example, from a domain expert or a supervised learning process.

Figure 8:
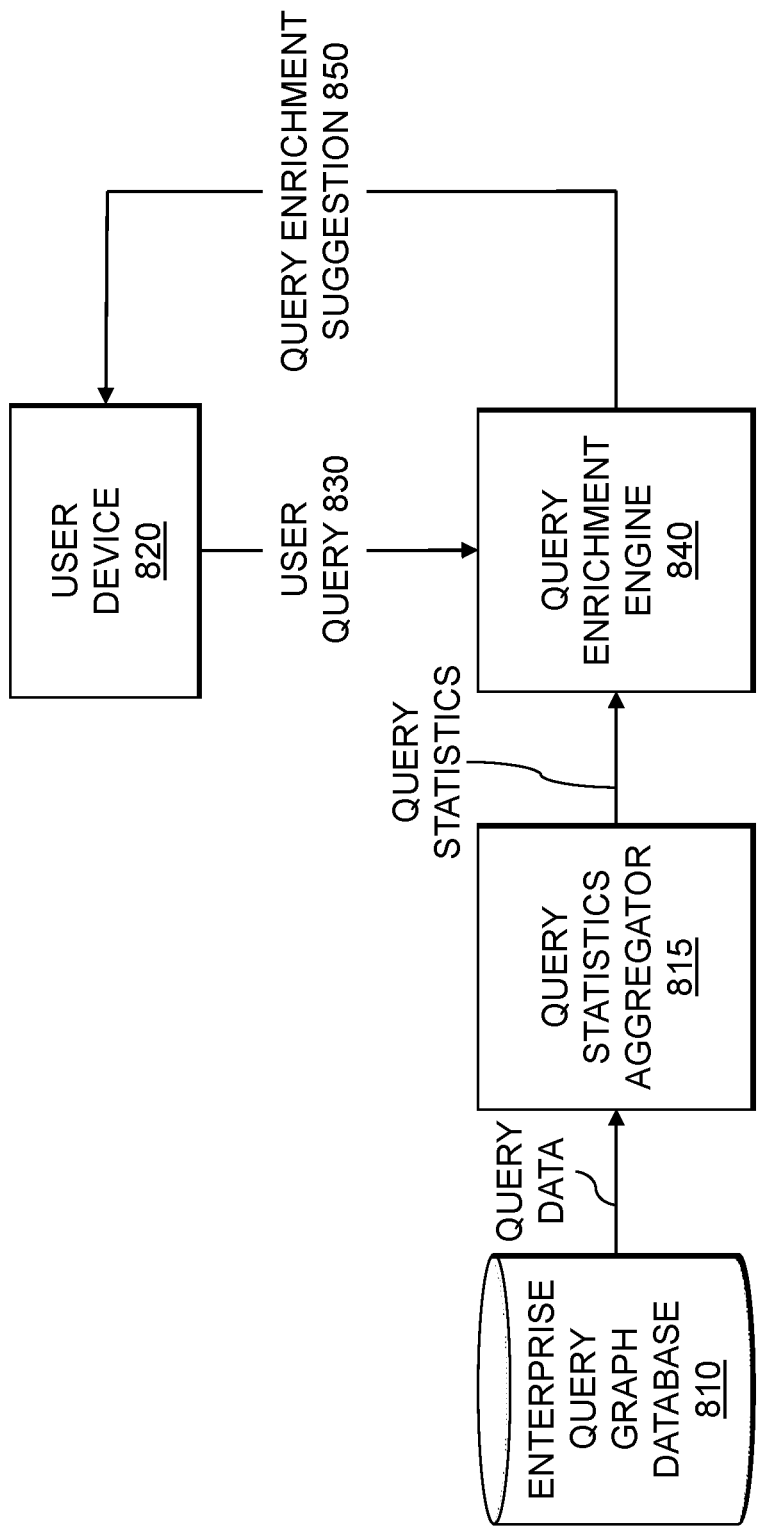
FIG. 8 illustrates an automated query enrichment engine in accordance with an illustrative embodiment.

FIG. 8 illustrates a query enrichment engine 840 in accordance with an illustrative embodiment. Generally, for a given user query 830 from a user device 820, the query enrichment engine 840 generates one or more query enrichment suggestions 850 comprising a suggested connection for the given user query 830 with one or more additional database tables (e.g., using join statements) based at least in part on one or more data characteristics referenced in the given user query 830. For example, if historical user queries joined certain additional databases to a query based on a particular data characteristic (such as "group by" age), then the query enrichment engine 840 suggests connecting the given user query 830, having the same data characteristic, with the additional database tables joined by the historical user queries (e.g., additional database tables that relate to age).

The FIG. 8 embodiment recognizes that the organization data of a given organization may be fragmented among many different databases (typically, some being more relevant for certain analyses than other databases), unknown to the user querying the data store. Thus, the query enrichment engine 840 automatically suggests connecting a given user query to one or more additional databases based on such learned connections from prior historical queries. For example, a "group by" statement that groups data in a given user query according to a particular data characteristic suggests a particular data entity of interest for the given user query. As noted above, a "group by" age statement in a query suggests a particular interest in an age of users. In other examples, an operation that transforms a larger multiset to a set of the values found within the multiset may also be a data characteristic that can be employed to join one or more additional tables on the keys of the values found within the multiset.

In the example of FIG. 8, query data, comprising graphical representations of historical queries of a given organization, is obtained from an enterprise query graph database 810. The query data is applied to a query statistics aggregator 815 that processes the historical query data to generate query statistics related to various data characteristics (e.g., the data of "group by" columns that were referenced in join operations of historical queries). In general, the generated query statistics correlate statistics of join operations and "group by" statements to quantify a possible relevance of adding one or more database tables to enrich a given query being processed.

During an inference phase, a user device 820 provides a given user query 830 (which may include an incomplete or a faulty query), that is applied to the query enrichment engine 840. The query enrichment engine 840 uses the query statistics generated by the query statistics aggregator 815 to generate the one or more query enrichment suggestions 850 with a suggested connection for the given user query 830 with one or more additional database tables (e.g., using join statements) based at least in part on one or more data characteristics referenced in the given user query 830.

Figure 9:
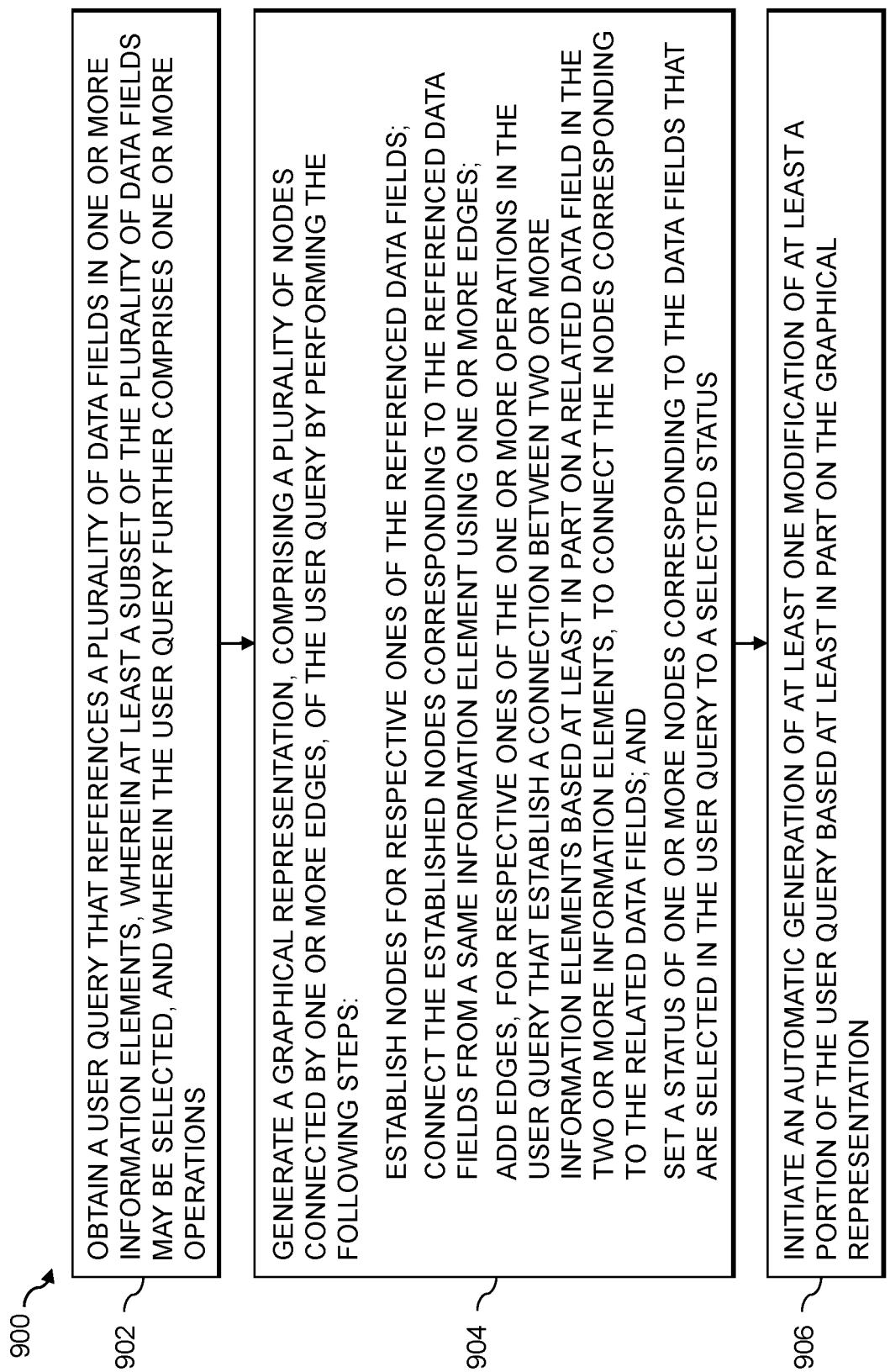
FIG. 9 is a flow diagram illustrating an exemplary implementation of an automated query modification process that uses graphical query representations in accordance with an illustrative embodiment.

FIG. 9 is a flow diagram illustrating an exemplary implementation of an automated query modification process 900 that uses graphical query representations in accordance with an illustrative embodiment. In the example of FIG. 9, the automated query modification process 900 initially obtains a user query in step 902 that references a plurality of data fields in one or more information elements, wherein at least a subset of the plurality of data fields may be selected, and wherein the user query further comprises one or more operations. The one or more information elements may comprise, for example, data structures (e.g., database tables) and/or data objects (e.g., JSON files or blobs).

In step 904, the automated query modification process 900 generates a graphical representation, comprising a plurality of nodes connected by one or more edges, of the user query by performing the following steps:

establishing nodes for respective ones of the referenced data fields;

connecting the established nodes corresponding to the referenced data fields from a same information element using one or more edges;

adding edges, for respective ones of the one or more operations in the user query that establish a connection between two or more information elements based at least in part on a related data field in the two or more information elements, to connect the nodes corresponding to the related data fields; and setting a status of one or more nodes corresponding to the data fields that are selected in the user query to a selected status.

In step 906, an automatic generation is initiated of at least one modification of at least a portion of the user query based at least in part on the graphical representation.

In some embodiments, the user query comprises a partial user query, and the method further comprises applying the graphical representation of the partial user query to a generative graph model to obtain a suggested completion of the partial user query, wherein the suggested completion provides a corresponding missing portion of the partial user query, wherein the generative graph model is trained to reconstruct a missing portion of at least one user query using one or more masked versions of a plurality of query graphs each associated with a corresponding historical user query; and wherein the at least one modification comprises the suggested completion of the partial user query. The generative graph model may be trained using query data of an organization associated with the user query.

In one or more embodiments, the method further comprises applying the user query to one or more prediction algorithms that identify one or more query errors in the user query; and wherein the at least one modification comprises a suggested correction of the identified one or more query errors. The one or more prediction algorithms may be configured to (i) assign the user query to a cluster of a plurality of clusters and employ one or more query error handling rules associated with the assigned cluster that identify the one or more query errors in the user query and a corresponding suggested correction of the one or more query errors in the user query, and/or (ii) identify the one or more query errors in the user query, using one or more trained models, and provide a corresponding suggested correction of the identified one or more query errors in the user query.

In at least one embodiment, the method further comprises evaluating the user query to identify at least one data characteristic used to perform at least one operation in the user query; and wherein the at least one modification comprises a suggested connection with one or more additional information elements based at least in part on the identified at least one data characteristic.

In various embodiments, the generating the graphical representation of the user query may further comprise: (i) for each new data field created in a given information element by at least one function recited in the user query that is applied to a given identified data field, adding a new node to the graphical representation for each new data field with an edge from the new node to the node in the graphical representation corresponding to the given identified data field; (ii) for each operation in the user query that specifies one or more conditions for obtaining data from one or more information elements, adding a new node to the graphical representation for each of the one or more conditions with an edge from each new node to the corresponding node in the graphical representation corresponding to the data field specified in the corresponding condition; and/or (iii) for each additional query operation in the user query, adding one or more new nodes to the graphical representation for each additional query operation with an edge from each new node to the corresponding one or more nodes in the graphical representation corresponding to the one or more data fields specified in the corresponding additional query operation.

The particular processing operations described in conjunction with the flow diagram of FIG. 9 are presented by way of illustrative example only, and should not be construed as limiting the scope of the disclosure in any way. Alternative embodiments can use other types of processing operations for automated query modification using graphical query representations. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In some embodiments, the disclosed techniques for automated query modification using graphical query representations assist a user that is generating a given user query by providing an automated completion, correction and/or enrichment of the given user query. The suggested completion, correction and/or enrichment of the given user query can be based on historical queries within the same organization as the given query. In this manner, improved queries are provided, even in the absence of access to domain experts or other reliable documentation of organization data and/or business processes.

One or more embodiments of the disclosure provide improved methods, apparatus and computer program products for automated query modification using graphical query representations. The foregoing applications and associated embodiments should be considered as illustrative only, and numerous other embodiments can be configured using the techniques disclosed herein, in a wide variety of different applications.

It should also be understood that the disclosed techniques for graph-based query processing, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for graph-based query processing may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute and/or storage services can be offered to cloud infrastructure tenants or other system users as a PaaS, IaaS, STaaS and/or FaaS offering, although numerous alternative arrangements are possible.

Some illustrative embodiments of a processing platform that may be used to implement at least a portion of an information processing system comprising cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based graph-based query processing engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based remote learning platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
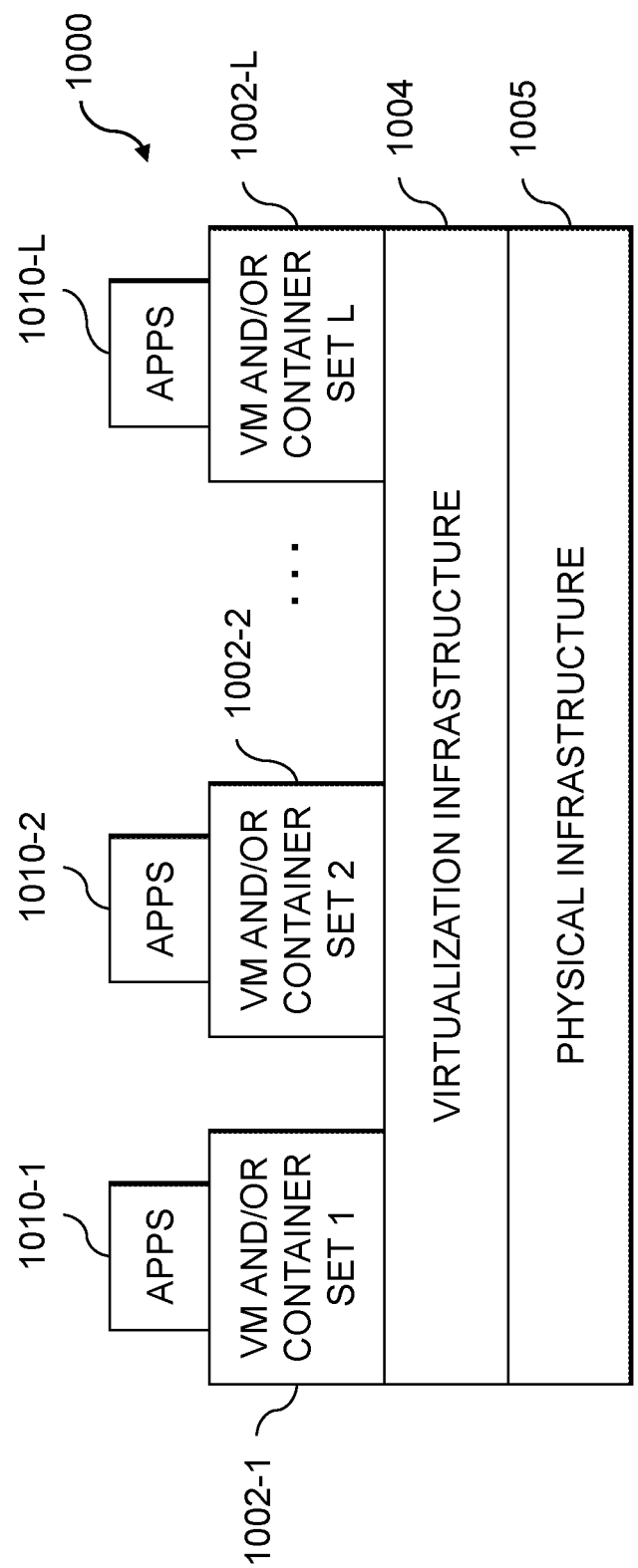
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide graph-based query processing functionality of the type described above for one or more processes running on a given one of the VMs. For example, each of the VMs can implement graph-based query processing control logic and associated functionality for automatically modifying queries using the graphical query representations.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide graph-based query processing functionality of the type described above for one or more processes running on different ones of the containers. For example, a container host device supporting multiple containers of one or more container sets can implement one or more instances of graph-based query processing control logic and associated functionality for automatically modifying queries using the graphical query representations.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a WAN, a LAN, a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, a CPU, a GPU, a TPU, an ASIC, an FPGA or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1111, which is used to interface the processing device with the network 1004 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
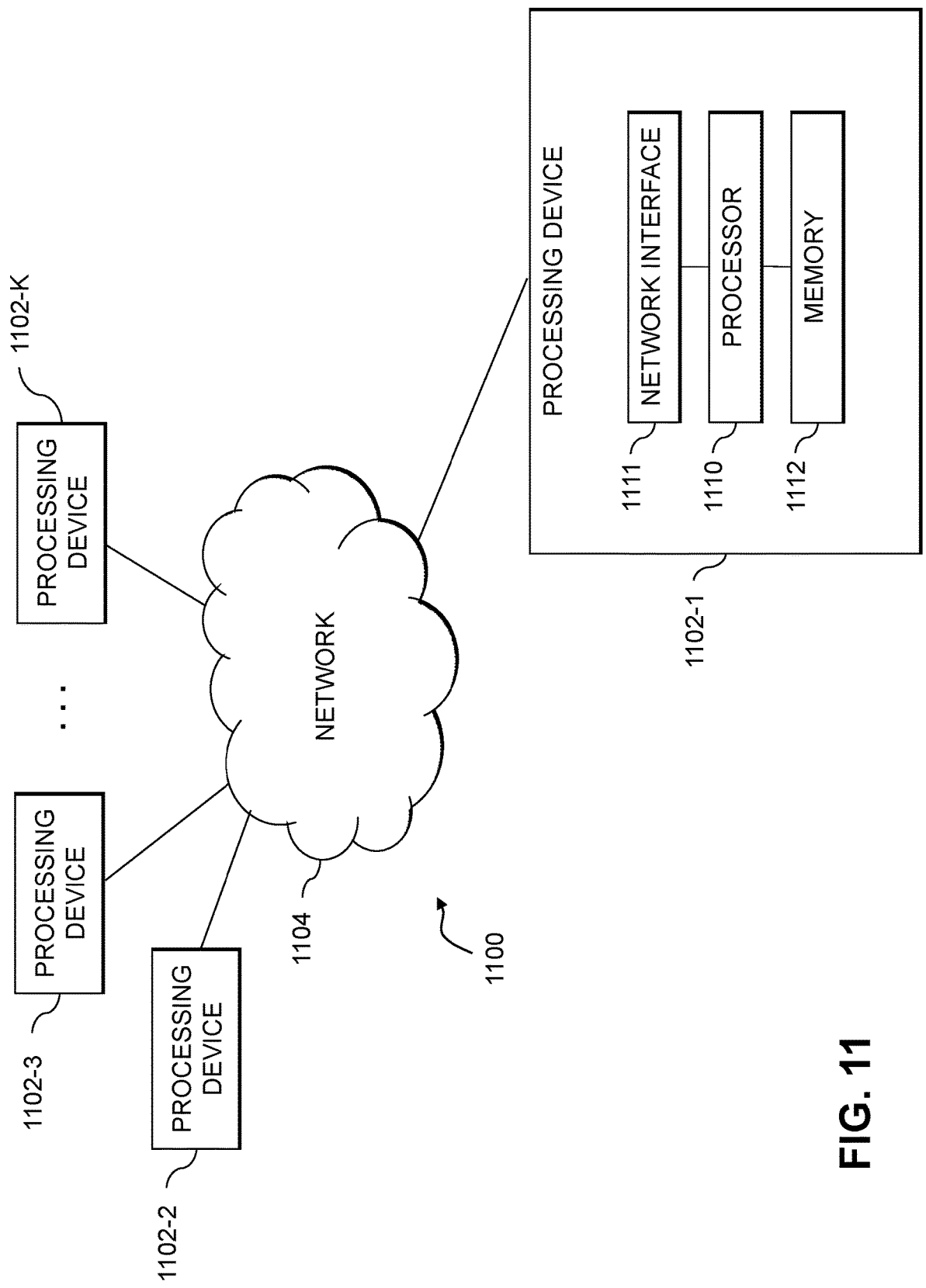
FIG. 11 illustrates another exemplary processing platform that may be used to implement at least a portion of one or more embodiments of the disclosure.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a portion of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining a user query that references a plurality of data fields in one or more information elements that the obtained user query is to be applied against, wherein at least a subset of the plurality of data fields referenced by the obtained user query may be selected, and wherein the obtained user query further comprises one or more operations, wherein the user query comprises a partial user query;
    generating a graphical representation, comprising a plurality of nodes connected by one or more edges, of the obtained user query by performing the following steps, wherein the graphical representation is based at least in part on a content of the obtained user query:
        establishing nodes in the graphical representation for respective ones of the referenced plurality of data fields of the obtained user query;
        connecting the established nodes corresponding to the referenced plurality of data fields from a same information element using one or more edges;
        adding edges, for respective ones of the one or more operations in the obtained user query that establish a connection between two or more information elements based at least in part on a related data field in the two or more information elements, to connect the nodes corresponding to the related data fields; and
        setting a status of one or more nodes corresponding to the data fields that are selected in the obtained user query to a selected status;
    applying the graphical representation of the partial user query to a generative graph model to obtain a suggested completion of the partial user query, wherein the suggested completion provides a corresponding missing portion of the partial user query, wherein the generative graph model is trained to reconstruct a missing portion of at least one user query using one or more masked versions of a plurality of query graphs each associated with a corresponding historical user query; and
    initiating an automatic generation of at least one modification of at least a portion of the obtained user query based at least in part on the graphical representation, wherein the at least one modification comprises the suggested completion of the partial user query;
    wherein the method is performed by at least one processing device comprising a processor coupled to a memory.

2. The method of claim 1, wherein the generative graph model is trained using query data of an organization associated with the user query.

3. The method of claim 1, further comprising applying the user query to one or more prediction algorithms that identify one or more query errors in the user query; and wherein the at least one modification comprises a suggested correction of the identified one or more query errors.

4. The method of claim 3, wherein the one or more prediction algorithms are configured to perform one or more of: (i) assigning the user query to a cluster of a plurality of clusters and employing one or more query error handling rules associated with the assigned cluster that identify the one or more query errors in the user query and a corresponding suggested correction of the one or more query errors in the user query, and (ii) identifying the one or more query errors in the user query, using one or more trained models, and providing a corresponding suggested correction of the identified one or more query errors in the user query.

5. The method of claim 1, further comprising evaluating the user query to identify at least one data characteristic used to perform at least one operation in the user query; and wherein the at least one modification comprises a suggested connection with one or more additional information elements based at least in part on the identified at least one data characteristic.

6. The method of claim 1, wherein the generating the graphical representation of the user query further comprises, for each new data field created in a given information element by at least one function recited in the user query that is applied to one or more identified data fields, adding a new node to the graphical representation for each new data field with an edge from the new node to the one or more nodes in the graphical representation corresponding to the one or more identified data fields.

7. The method of claim 1, wherein the generating the graphical representation of the user query further comprises, for each operation in the user query that specifies one or more conditions for obtaining data from one or more information elements, adding a new node to the graphical representation for each of the one or more conditions with an edge from each new node to the corresponding node in the graphical representation corresponding to the data field specified in the corresponding condition.

8. The method of claim 1, wherein the generating the graphical representation of the user query further comprises, for each additional query operation in the user query, adding one or more new nodes to the graphical representation for each additional query operation with an edge from each new node to the corresponding one or more nodes in the graphical representation corresponding to one or more data fields specified in the corresponding additional query operation.

9. The method of claim 1, wherein the one or more information elements comprise one or more of data structures and data objects.

10. An apparatus comprising:
at least one processing device comprising a processor coupled to a memory;
the at least one processing device being configured to implement the following steps:
obtaining a user query that references a plurality of data fields in one or more information elements that the obtained user query is to be applied against, wherein at least a subset of the plurality of data fields referenced by the obtained user query may be selected, and wherein the obtained user query further comprises one or more operations, wherein the user query comprises a partial user query;
generating a graphical representation, comprising a plurality of nodes connected by one or more edges, of the obtained user query by performing the following steps, wherein the graphical representation is based at least in part on a content of the obtained user query:
establishing nodes in the graphical representation for respective ones of the referenced plurality of data fields of the obtained user query;
connecting the established nodes corresponding to the referenced plurality of data fields from a same information element using one or more edges;
adding edges, for respective ones of the one or more operations in the obtained user query that establish a connection between two or more information elements based at least in part on a related data field in the two or more information elements, to connect the nodes corresponding to the related data fields; and
setting a status of one or more nodes corresponding to the data fields that are selected in the obtained user query to a selected status;
applying the graphical representation of the partial user query to a generative graph model to obtain a suggested completion of the partial user query, wherein the suggested completion provides a corresponding missing portion of the partial user query, wherein the generative graph model is trained to reconstruct a missing portion of at least one user query using one or more masked versions of a plurality of query graphs each associated with a corresponding historical user query; and
initiating an automatic generation of at least one modification of at least a portion of the obtained user query based at least in part on the graphical representation, wherein the at least one modification comprises the suggested completion of the partial user query.

11. The apparatus of claim 10, wherein the generative graph model is trained using query data of an organization associated with the user query.

12. The apparatus of claim 10, further comprising applying the user query to one or more prediction algorithms that identify one or more query errors in the user query; and wherein the at least one modification comprises a suggested correction of the identified one or more query errors.

13. The apparatus of claim 12, wherein the one or more prediction algorithms are configured to perform one or more of: (i) assigning the user query to a cluster of a plurality of clusters and employing one or more query error handling rules associated with the assigned cluster that identify the one or more query errors in the user query and a corresponding suggested correction of the one or more query errors in the user query, and (ii) identifying the one or more query errors in the user query, using one or more trained models, and providing a corresponding suggested correction of the identified one or more query errors in the user query.

14. The apparatus of claim 10, further comprising evaluating the user query to identify at least one data characteristic used to perform at least one operation in the user query; and wherein the at least one modification comprises a suggested connection with one or more additional information elements based at least in part on the identified at least one data characteristic.

15. A non-transitory processor-readable storage medium having stored therein program code of one or more software programs, wherein the program code when executed by at least one processing device causes the at least one processing device to perform the following steps:
obtaining a user query that references a plurality of data fields in one or more information elements that the obtained user query is to be applied against, wherein at least a subset of the plurality of data fields referenced by the obtained user query may be selected, and wherein the obtained user query further comprises one or more operations, wherein the user query comprises a partial user query;
generating a graphical representation, comprising a plurality of nodes connected by one or more edges, of the obtained user query by performing the following steps, wherein the graphical representation is based at least in part on a content of the obtained user query:
establishing nodes in the graphical representation for respective ones of the referenced plurality of data fields of the obtained user query;
connecting the established nodes corresponding to the referenced plurality of data fields from a same information element using one or more edges;
adding edges, for respective ones of the one or more operations in the obtained user query that establish a connection between two or more information elements based at least in part on a related data field in the two or more information elements, to connect the nodes corresponding to the related data fields; and setting a status of one or more nodes corresponding to the data fields that are selected in the obtained user query to a selected status;

applying the graphical representation of the partial user query to a generative graph model to obtain a suggested completion of the partial user query, wherein the suggested completion provides a corresponding missing portion of the partial user query, wherein the generative graph model is trained to reconstruct a missing portion of at least one user query using one or more masked versions of a plurality of query graphs each associated with a corresponding historical user query; and initiating an automatic generation of at least one modification of at least a portion of the obtained user query based at least in part on the graphical representation, wherein the at least one modification comprises the suggested completion of the partial user query.

16. The non-transitory processor-readable storage medium of claim 15, further comprising applying the user query to one or more prediction algorithms that identify one or more query errors in the user query; and wherein the at least one modification comprises a suggested correction of the identified one or more query errors.

17. The non-transitory processor-readable storage medium of claim 15, further comprising evaluating the user query to identify at least one data characteristic used to perform at least one operation in the user query; and wherein the at least one modification comprises a suggested connection with one or more additional information elements based at least in part on the identified at least one data characteristic.

18. The non-transitory processor-readable storage medium of claim 15, wherein the generative graph model is trained using query data of an organization associated with the user query.

19. The non-transitory processor-readable storage medium of claim 16, wherein the one or more prediction algorithms are configured to perform one or more of: (i) assigning the user query to a cluster of a plurality of clusters and employing one or more query error handling rules associated with the assigned cluster that identify the one or more query errors in the user query and a corresponding suggested correction of the one or more query errors in the user query, and (ii) identifying the one or more query errors in the user query, using one or more trained models, and providing a corresponding suggested correction of the identified one or more query errors in the user query.

20. The non-transitory processor-readable storage medium of claim 15, wherein the generating the graphical representation of the user query further comprises, for each new data field created in a given information element by at least one function recited in the user query that is applied to one or more identified data fields, adding a new node to the graphical representation for each new data field with an edge from the new node to the one or more nodes in the graphical representation corresponding to the one or more identified data fields.

* * * * *